July 21, 1964
L. H. MORIN
3,141,289
TRAVELER HAVING MAGNETIC CHARACTERISTICS
Filed Aug. 22, 1962
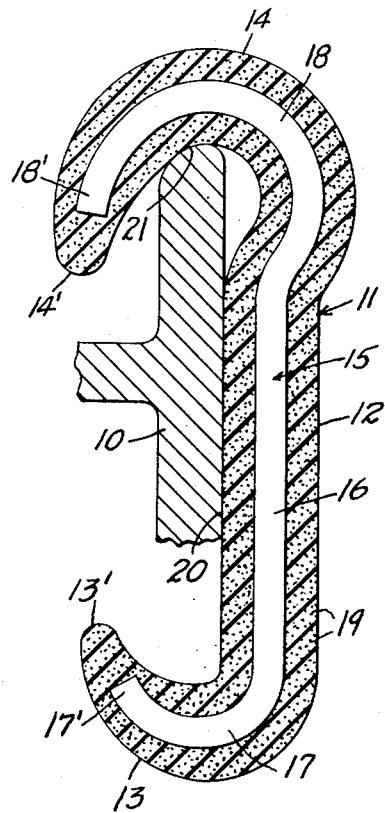
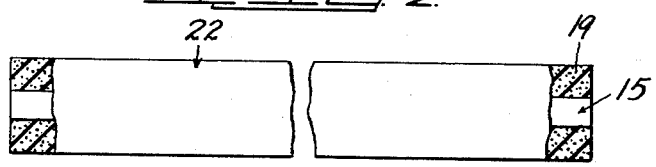
INVENTOR.
LOUIS H. MORIN
BY
Howard C. Thompson
ATTORNEY

United States Patent Office 3,141,289
Patented July 21, 1964

3,141,289
TRAVELER HAVING MAGNETIC CHARACTERISTICS
Louis H. Morin, Bronx, N.Y., assignor to Coats & Clark Inc., New York, N.Y., a corporation of Delaware
Filed Aug. 22, 1962, Ser. No. 218,735
6 Claims. (Cl. 57—125)

This invention relates to travelers, wherein the body portion of the traveler is magnetic to thereby provide in the traveler additional resistance or drag in movement thereof over the steel traveler ring and, thereby, eliminate the necessity of producing a heavier traveler. More particularly, the invention deals with a traveler of the character defined, wherein the body of the traveler is composed of a magnetic plastic, such as rubber, and further wherein a wire or reinforcing core is employed in the traveler and extending the major portion of the length thereof.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is an enlarged longitudinal sectional view through a traveler made according to my invention and illustrating, in section, part of a traveler ring, upon which the traveler is operated; and FIG. 2 is a broken plan and sectional view of a workpiece, from which the traveler, shown in FIG. 1, is formed.

In illustrating one adaptation and use of my invention, I have shown in the accompanying drawing a traveler, wherein the body portion is formed of magnetic rubber and includes a wire or reinforcing core extending the major portion of the length thereof, the traveler being formed from a workpiece blank, diagrammatically illustrated in FIG. 2 in accordance with a method forming the subject matter of a companion application, Serial No. 218,734, filed August 22, 1962, filed by me of equal date herewith.

Considering FIG. 1 of the drawing, 10 represents, in part, a section through a traveler ring, upon which travelers are movable, one traveler being illustrated at 11 in said figure, in section, and the traveler comprises a central shank portion 12 having, at one end, a small rounded hook 13 and at the other end a large rounded hook 14. Arranged within the traveler is a reinforcing wire or rod core 15, preferably formed of metal, the core including a shank 16 fitting in the shank 12 of the traveler, the shank having rounded ends 17 and 18 fitting in the hook ends 13 and 14, respectively, of the traveler. The rounded ends 17 and 18 terminate, as seen at 17' and 18', short of the terminal ends 13', 14' of the hooks 13, 14. In other words, the ends 13', 14' cover and conceal the terminal ends 17', 18' of the core. While the body portion of the traveler is illustrated as being formed from rubber, or rubber compositions, it will be understood that any suitable type and kind of plastic can be employed and the stippling, shown at 19, is to diagrammatically illustrate the magnetic characteristics or elements of the body of the traveler. It will, thus, be apparent that surfaces of the body of the traveler engaging the ring 10, as, for example, the surface 20 of the shank 12 or the surface 21 of the hook 14, will establish attraction to the ring and create the desired resistance or drag for proper functioning of the traveler in its movement on the ring.

Considering FIG. 2 of the drawing, I have shown, in broken elevation and section, a workpiece 22 cut from an elongated workpiece strand and utilized in formation of the traveler, as seen in FIG. 1, in accordance with the method more fully disclosed in the companion application hereinbefore referred to.

This method is briefly outlined for clarification in this application as follows. The workpiece, as illustrated at 22 in FIG. 2, comprising a strand, is formed by extruding the plastic material employed onto the core 15, the plastic material being at such time in a more or less putty-like state and is a thermosetting-type of plasitc, including the magnetic characteristics as previously identified by the stippling 19. This workpiece 22 is first shaped by suitable tools to the general contour or outline of the traveler, as seen in FIG. 1, the core 15 being readily formable serves to maintain this general contour in the formed workpiece thus produced.

The next step in the method consists in then placing the formed workpiece in dies or molds for final forming and setting the plastic material, in which operation this material extends beyond the ends of the core 15, as seen at 13', 14' of FIG. 4, and in the curing operation, which in the case of rubber will be vulcanization, the plastic body of the traveler will assume a hard state.

The term "magnetic characteristics" used herein means the characteristics of a magnet having the usual polarity characteristics and the power to attract steel, iron, or other materials of a magnetic attractable nature.

It will be apparent that the basic principle of my invention resides in the provision of a traveler having the wear resistant and magnetic properties for the purposes defined and, from this standpoint, the particular materials employed in formation of the traveler can be varied, the present illustration simply presenting one of many adaptations and uses of travelers of the kind under consideration.

Having fully described my invention, what I claim as new and desire to secure by Letters Patent is:

1. A traveler of the character described comprising a body including a shank portion having hook ends, and said body having magnetic characteristics whereby, in movement of a traveler on a magnetic attractable ring, surfaces of said traveler engaging the ring will establish a drag on the ring in controlling action of the traveler on said ring.

2. A traveler as defined in claim 1, wherein said body comprises a thermosetting plastic including magnetic elements.

3. A traveler as defined in claim 2, wherein said body includes a core extending the major portion of the length thereof.

4. A traveler as defined in claim 3, wherein the core comprises a readily formable wire.

5. A traveler as defined in claim 4, wherein the core comprises a readily formable wire of magnetically attractable material.

6. A traveler as defined in claim 2, wherein the plastic comprises a rubber base plastic.

References Cited in the file of this patent
UNITED STATES PATENTS

| 761,086 | Mellett | May 31, 1904 |
| 2,559,734 | Reid | July 10, 1951 |
| 2,918,780 | Bowen | Dec. 29, 1959 |
| 2,959,832 | Baermann | Nov. 15, 1960 |
| 3,086,247 | Rubens | Apr. 23, 1963 |

FOREIGN PATENTS

| 1,009,799 | France | Mar. 12, 1952 |
| 807,964 | Great Britain | Jan. 28, 1959 |